Aug. 21, 1934.  E. PRESTENBACK  1,970,672
TRAP REST
Filed April 25, 1932  2 Sheets-Sheet 1
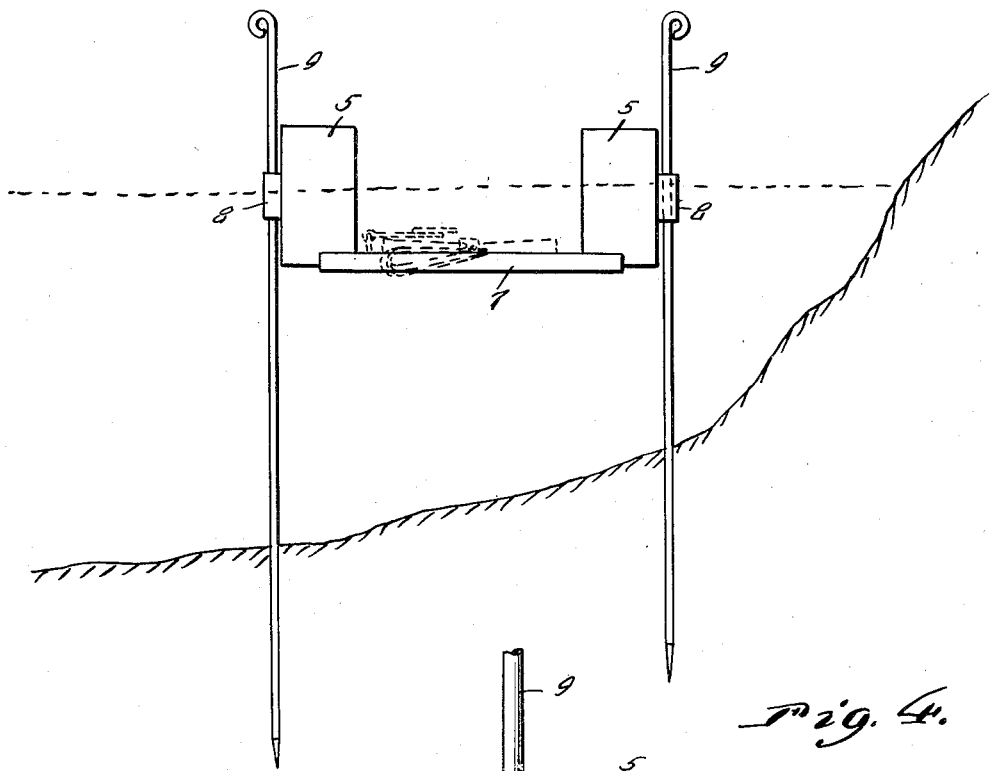
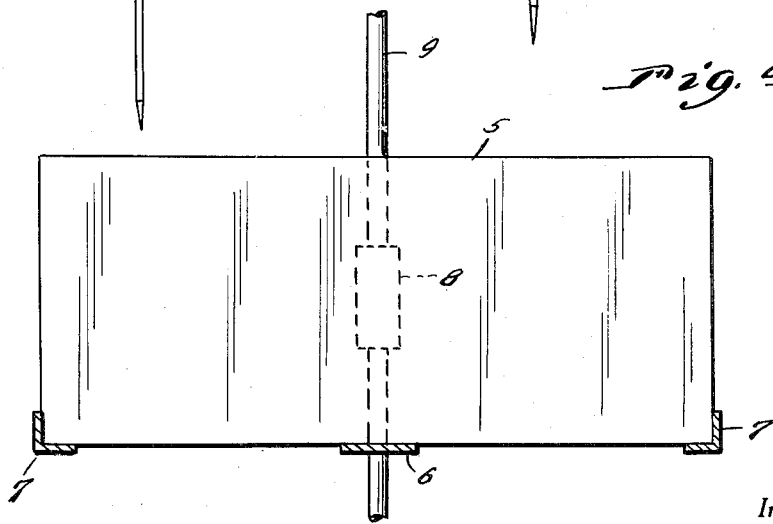
Inventor
Edwin Prestenback,
By Clarence A. O'Brien
Attorney

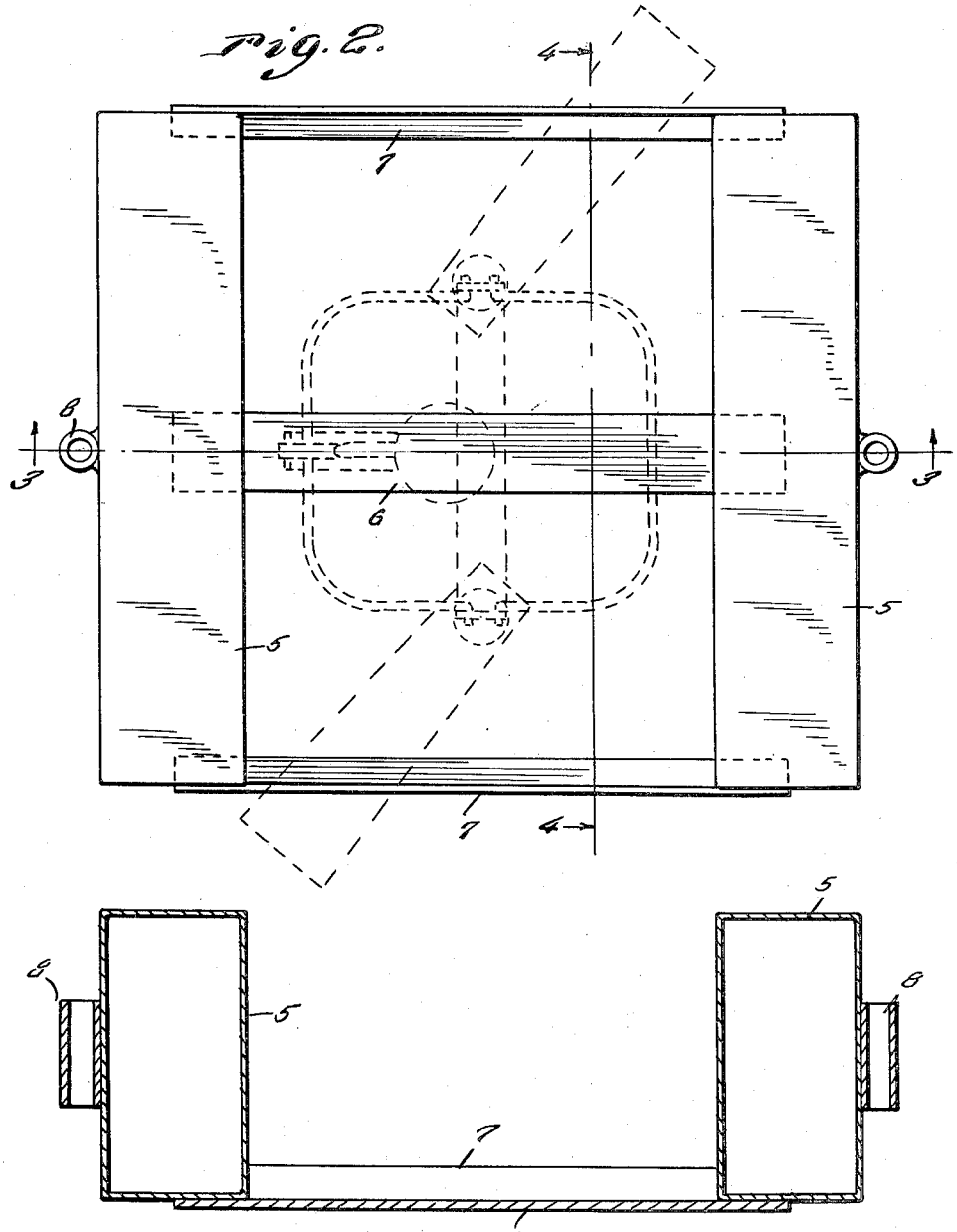

UNITED STATES PATENT OFFICE 1,970,672

TRAP REST

Edwin Prestenback, New Orleans, La.

Application April 25, 1932, Serial No. 607,425

1 Claim. (Cl. 43—96)

The present invention relates to rests for holding traps especially for supporting the traps beneath the surface of the water in position for catching muskrats and the like and the prime object of the invention resides in the provision of a float supported rest which is mounted so that the same may rise and fall with the change in level of the body of water.

Another very important object of the invention resides in the provision of a trap rest of this nature which is exceedingly simple in its construction, inexpensive to manufacture, thoroughly efficient and reliable in use and operation, and otherwise well adapted to the purpose for which it is designed.

With the above and numerous other objects in view as will appear as the description proceeds the invention consists in certain novel features of construction and in the combination and arrangement of parts as will be hereinafter more fully described and claimed.

In the drawings:

Figure 1 is a side elevation of a rest embodying the features of my invention.

Figure 2 is a top plan view thereof.

Figure 3 is a sectional view therethrough taken substantially on the line 3—3 of Figure 2, and Figure 4 is a sectional view taken substantially on the line 4—4 of Figure 2.

Referring to the drawings in detail it will be seen that numerals 5 denote a pair of hollow box like float members of a parallelepiped formation. These float elements are connected by a central platform 6 fixed to the central bottom portions of the elements and extending therebetween and also by angle iron end members 7 attached to the lower end corners of the elements and extending therebetween.

On the outer side of the elements 5 there is mounted a vertical sleeve 8. Numerals 9 denote pegs or rods, the lower ends of which are adapted to be driven in the bed of a body of water as indicated in Figure 1 so as to be disposed in vertical position and the sleeves are adapted to slide on these pegs or rods so that the trap may be supported under the surface of the water as indicated in Figure 1 and the whole rest will rise and fall with the level of the body of the water so that the trap will always be approximately the same distance under the surface of the water.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A floating trap rest comprising a pair of spaced parallel floats substantially rectangular in cross section and having vertical tubular guide-engaging elements at the outer sides thereof, angle irons connecting the ends of the float and having their horizontal flanges secured to the under sides of the floats and their vertical flanges secured to the ends of the floats; and a narrow elongated flat board extending between the floats and secured at its end to the under sides of the floats, said board being adapted to support a trap.

EDWIN PRESTENBACK.